United States Patent

Seksaria et al.

[11] Patent Number: 6,012,764
[45] Date of Patent: Jan. 11, 2000

[54] VEHICLE GREENHOUSE SUPPORT ASSEMBLY AND ASSOCIATED METHOD

[75] Inventors: Dinesh C. Seksaria, Novi; Timothy D. Myers, Birmingham, both of Mich.

[73] Assignee: Aluminum Company of America, Pittsburgh, Pa.

[21] Appl. No.: 08/872,915

[22] Filed: Jun. 11, 1997

[51] Int. Cl.$^7$ ........................................ B60J 7/00
[52] U.S. Cl. ................ 296/189; 296/214; 296/203.01; 280/751; 280/748
[58] Field of Search .................... 280/748, 751, 280/752; 296/189, 203.01, 203.03, 214, 39.1

[56] References Cited

U.S. PATENT DOCUMENTS

| | | |
|---|---|---|
| 3,011,602 | 12/1961 | Ensrud et al. . |
| 3,930,665 | 1/1976 | Ikawa ........................................ 280/751 |
| 3,989,275 | 11/1976 | Finch et al. . |
| 4,411,121 | 10/1983 | Blacklin et al. . |
| 4,545,172 | 10/1985 | Wardill . |
| 5,046,291 | 9/1991 | Narayan . |
| 5,098,124 | 3/1992 | Breed et al. ............................... 280/751 |
| 5,131,709 | 7/1992 | Spica ........................................ 296/39.1 |
| 5,163,730 | 11/1992 | Welch . |
| 5,228,252 | 7/1993 | Nehls . |
| 5,306,066 | 4/1994 | Saathoff . |
| 5,306,068 | 4/1994 | Nakae et al. . |
| 5,382,051 | 1/1995 | Glance . |
| 5,544,933 | 8/1996 | Shahab et al. ........................ 296/203.01 |
| 5,560,672 | 10/1996 | Lim et al. ............................... 280/748 |
| 5,593,182 | 1/1997 | Frost ........................................ 280/751 |
| 5,609,385 | 3/1997 | Daniel et al. ......................... 296/203.01 |
| 5,660,426 | 8/1997 | Sugimori et al. ........................ 296/189 |

FOREIGN PATENT DOCUMENTS

| | | | |
|---|---|---|---|
| 121994 | 5/1960 | France ..................................... 296/214 |
| 3116498 | 12/1982 | Germany ................................ 49/501 |
| 52-37317 | 3/1977 | Japan ..................................... 296/214 |
| 59-39545 | 3/1983 | Japan ..................................... 296/39.1 |

Primary Examiner—Joseph D. Pape
Assistant Examiner—Kiran Patel
Attorney, Agent, or Firm—Arnold B. Silverman; Thomas R. Trempus

[57] ABSTRACT

A vehicle greenhouse support assembly has an elongated substantially rigid beam, a deformable sheet covering at least a portion of the beam adapted to face the interior of the vehicle with the deformable sheet having a plurality of protrusions. An overlying trim element covers at least a portion of the deformable sheet. The protrusions preferably cover about 30 to 60 percent of the sheet and the sheet is preferably an aluminum sheet having a thickness of about 0.01 inch to 0.02 inch. Impact between the support assembly and a passenger will cause deformation and/or tearing of the deformable sheet and absorption of at least a portion of the energy impact, thereby minimizing the likelihood of a vehicle occupant suffering a serious injury. An associated method is provided.

43 Claims, 2 Drawing Sheets

VEHICLE GREENHOUSE SUPPORT ASSEMBLY AND ASSOCIATED METHOD

BACKGROUND OF THE INVENTION

1. Field of the Invention

The present invention relates to an improved vehicle greenhouse head injury reduction system assembly which serves to mitigate impact to minimize the risk of injuries to a vehicle occupant in the event of a collision and to an associated method.

2. Description of the Prior Art

In recent years a great deal of attention has been directed toward the critical need to minimize injury to occupants of a vehicle in the case of a collision. Cars have been made safer through the use of safety devices, such as seat belts and inflatable restraints, such as airbags. Also, the automobile manufacturers have directed attention toward making the car body and components more energy absorbent in the event of a collision. The United States government has established the Motor Vehicle Safety Standards in order to mandate certain minimum safety requirements.

An area that has received increasing attention in recent years is the desire to minimize damage to a vehicle occupant's head in the event of a collision. The Federal Motor Vehicle Safety Standards (FMVSS-201) contains head injury criteria. These standards are proposed to be amended to include a section on head injuries caused by impact with the greenhouse.

The greenhouse of the vehicle includes regions of the vehicle interior which are most likely to be contacted by an occupant's head, particularly in a collision which involves impact from the side. Examples of such portions of the vehicle are support pillars, such as those that appear on (a) opposite sides of the windshields, (b) between the vehicle doors, (c) between the rear window and the side portion of the car, as well as the headers which overly the windshield and rear window, and the rails which overly the doors. U.S. Pat. No. 3,989,275 discloses the use of rigid polyurethane foam in vehicle doors as energy absorbing means. See also U.S. Pat. No. 5,306,066 which discloses the use of a honeycomb energy absorbing material in a vehicle door.

U.S. Pat. No. 4,545,172 which discloses the use of a corrugated tube for resisting axially applied loads has the obvious disadvantage of not having meaningful resistance to loads applied perpendicular to the axial direction.

U.S. Pat. No. 5,382,051 discloses the use of mechanical airbags without the use of pressurized air as a means of absorbing energy. This system has limited energy absorbing capacity.

It has been known to suggest the use of a one-piece energy absorbing bracket with a "buckling portion" designed to undergo deformation when subjected to impact transmitted through the molding. See U.S. Pat. No. 5,163,730. Such a system occupies excessive interior space.

Despite the foregoing prior art constructions, there remains a very real and substantial need for improved head impact energy absorbing systems that use minimum space in the automotive vehicle greenhouses so as to minimize injury to occupants in a collision and, particularly, minimize head injuries.

SUMMARY OF THE INVENTION

The present invention has solved the above-described problem by providing a unique vehicle greenhouse head impact energy absorbing system. In a preferred embodiment, an elongated substantially rigid beam has interiorly exposed portions covered by a deformable sheet. The deformable sheet has a plurality of protrusions. An overlying trim element covers at least a portion of the deformable sheet. In this manner, an assembly is provided such that impact load applied to the vehicle greenhouse support will result in deformation and/or tearing of the deformable sheet as it absorbs the energy of the impact. This results in the least likelihood of injury to the occupant's head through direct or indirect contact between the rigid beam and the occupant's head. In a preferred embodiment, the deformable sheet is aluminum sheet having a thickness of about 0.01 inch to 0.02 inch and the protrusions having a height of about ⅜ inch to ⅞ inch. The protrusions preferably cover about 30 to 60 percent of the sheet. It is preferred to provide a plurality of these greenhouse energy absorbing support assemblies within the passenger compartment of a vehicle.

An associated method involves providing the rigid beam and creating a plurality of protrusions in the sheet by stretch forming the sheet in localized areas beyond the yield point so as to establish permanent deformation. The deformable sheet is preferably adhesively secured in covering relationship to the beam and the overlying trim is then provided and secured to the pillar.

It is an object of the present invention to provide improved energy absorbing vehicle greenhouse support assemblies so as to minimize injury to occupants in collisions.

It is another object of the present invention to provide such a vehicle greenhouse support assembly which will effectively absorb energy resulting from impact with the head of a vehicle occupant.

It is a further object of the present invention to provide in the vehicle greenhouse support assembly a deformable sheet having a plurality of protrusions which will deform and/or tear responsive to impact therewith.

A further object of the present invention is to provide such a vehicle greenhouse support assembly wherein the energy absorbing portion of the assembly may readily be replaced without requiring substantial body work in the event of a protrusion deforming impact.

It is another object of the invention to provide a method of creating such a vehicle greenhouse energy absorbing support assembly.

It is a further object of the invention to provide such a system which may be employed without meaningful addition of weight to the vehicle and without occupying significant interior space of the passenger compartment of the vehicle.

These and other objects of the invention will be more fully understood from the following description of the invention on reference to the illustrations appended hereto.

DESCRIPTION OF THE PREFERRED EMBODIMENTS

The term "vehicle" as employed herein means a vehicle powered by an internal combustion engine or battery and having a passenger compartment and shall expressly include, but not be limited to automobiles, vans, sport utility vehicles, trucks, truck tractors, trains, buses and station wagons.

The term "greenhouse" as employed herein shall mean the upper portion of an automotive vehicle generally above the level of the dashboard and window sills and shall include, but not be limited to, body pillars adjacent the windshield, the doors and the rear window and rails including door headers and the roof.

The term "greenhouse support" shall mean greenhouse structural members including body pillars, roof struts, rails, door headers, and other structural members within the greenhouse which may come into direct or indirect contact with the head of an occupant of a vehicle.

Figure 1:
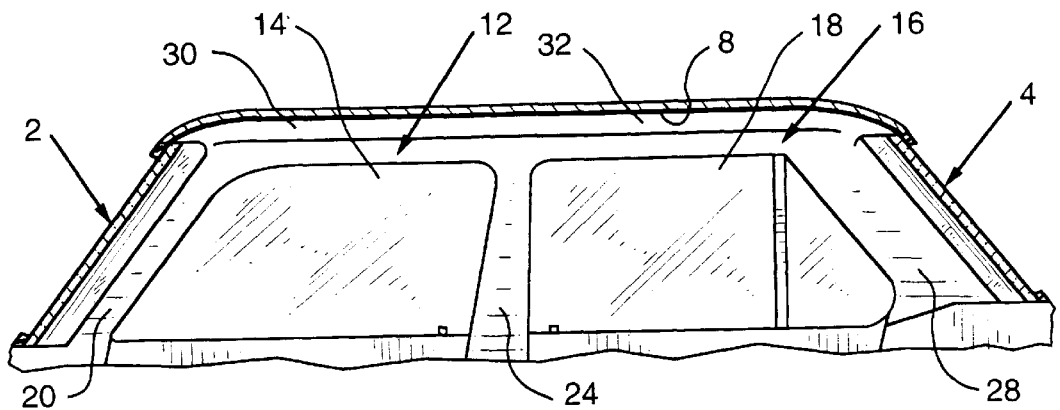
FIG. 1 is a schematic fragmentary view of a portion of the interior of a vehicle.

Referring to FIG. 1, there is shown a fragmentary portion of the upper portion of one side of the vehicle interior, a windshield 2, a rear window 4, a roof or ceiling portion 8, a front door 12 having a window 14, and a rear door 16 having a window 18. A pillar 20 separates the windshield 2 and the door 12 and serves as a generally vertically oriented load bearing member which, for convenience of reference herein, will be designated a "beam" as will other structural greenhouse supports regardless of their orientation within the vehicle. A pillar 24 is disposed between the two doors 12, 16 and a pillar 28 is disposed between the rear window 4 and the rear door 16. Also forming part of the greenhouse and not specifically shown are door headers or rails 30, 32 which overlie the doors. It will be appreciated that in the event of a collision, particularly one from the side or angularly from the side, an occupant could be thrown into contact with any of the greenhouse supports, thereby creating a substantial risk of injury.

Figure 2:
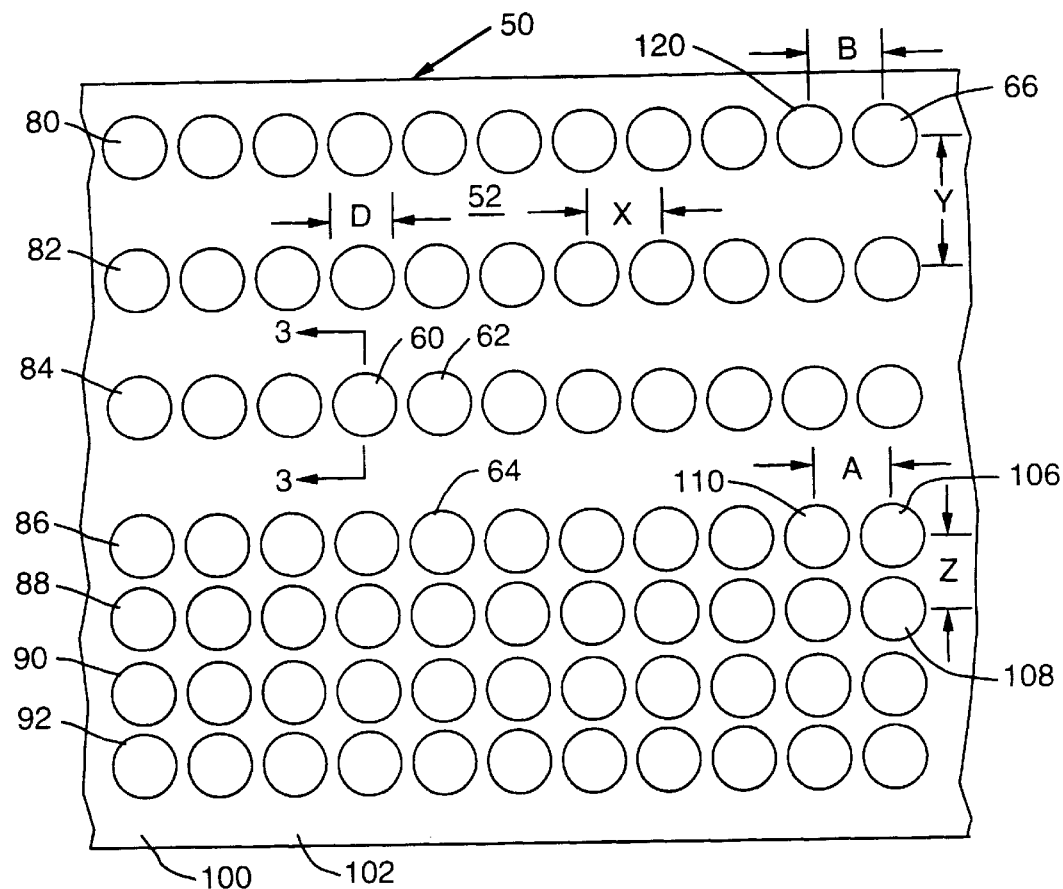
FIG. 2 is a top plan view of a form of a protrusion containing sheet of the present invention.
Figure 3:
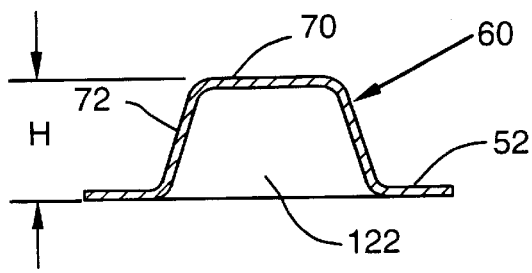
FIG. 3 is a cross-sectional illustration showing a particular form of protrusion taken through 3—3 of FIG. 2.

Referring to FIGS. 2 and 3, a preferred embodiment of the present invention will be considered. Sheet 50, which is preferably a deformable relatively thin sheet made of a metal, such as aluminum, copper, brass, or resinous plastic materials. The choice of material and protrusion shape combine to create the desired fracturing or tearing in absorbing energy responsive to impact forces.

Sheet 50 has a generally planar portion 50 and a plurality of upwardly projecting protrusions, such as 60, 62, 64 and 66, for example.

In the form shown in FIGS. 2 and 3, the protrusions 60–66 (even numbers only) and the other protrusions on the sheet are all preferably substantially identical in height, diameter and configuration and, in the form shown, are generally frustoconical in shape. It will be appreciated that other configurations, such as spherical, for example, may be employed. The protrusions preferably have an outer diameter D measured at the base of preferably about 1 inch and have a height H of about ⅜ inch to ⅞ inch and preferably about ⅜ to ⅝ inch. The protrusions preferably cover about 30 to 60 percent of the area of sheet 50. As shown in FIG. 3, the protrusions in the form shown have an upper surface 70 which is generally flat and the original flat surface of the sheet 52 with a tapered connecting annular wall 72.

In the form shown in FIG. 2, the protrusions are in a series of rows, such as 80, 82, 84, 86, 88, 90, 92. The spacing X between adjacent protrusions in a row, such as row 82, measured center-to-center, may be about 1 to 1.5 inches. The protrusions also appear in a series of aligned crossrows such as 100, 102, for example. Other patterns of alignment may be provided, if desired.

FIG. 2 shows two different spacing arrangements which may be used together or separately in a particular installation. In the spacing shown in rows 86, 88, 90, 92, adjacent protrusions, such as 106, 108 have a center-to-center spacing of Z which may be about 1 to 1.5 inches. The identical spacing may be employed between adjacent rows, such as the center-to-center spacing between protrusion 106 and 110, where spacing is indicated by the letter A. Considering rows 80, 82 and 84, the spacing Y between adjacent rows measured center-to-center between protrusions may be about 1 to 1.5 inches and the center-to-center spacing B between protrusion 66 and 120 may be on the order of about 1 to 1.5 inches. With sheet of this type, the sheet 50 may be readily deformed so as to conform in shape to an elongated substantially rigid beam which serves as a portion of the vehicle greenhouse support assembly, thereby not limiting protection to a single surface of a greenhouse support which is exposed to the interior of the vehicle.

In forming the protrusions in a metal sheet, by means well known to those skilled in the art, the flat sheet 50 is subjected to local deformation which stretches the portion that will form the protrusions beyond the yield point such that they will permanently assume the desired protrusion configuration. As shown in FIG. 3, the protrusions have a hollow region 122. A resinous plastic sheet may be formed by molding, if desired.

Figure 4:
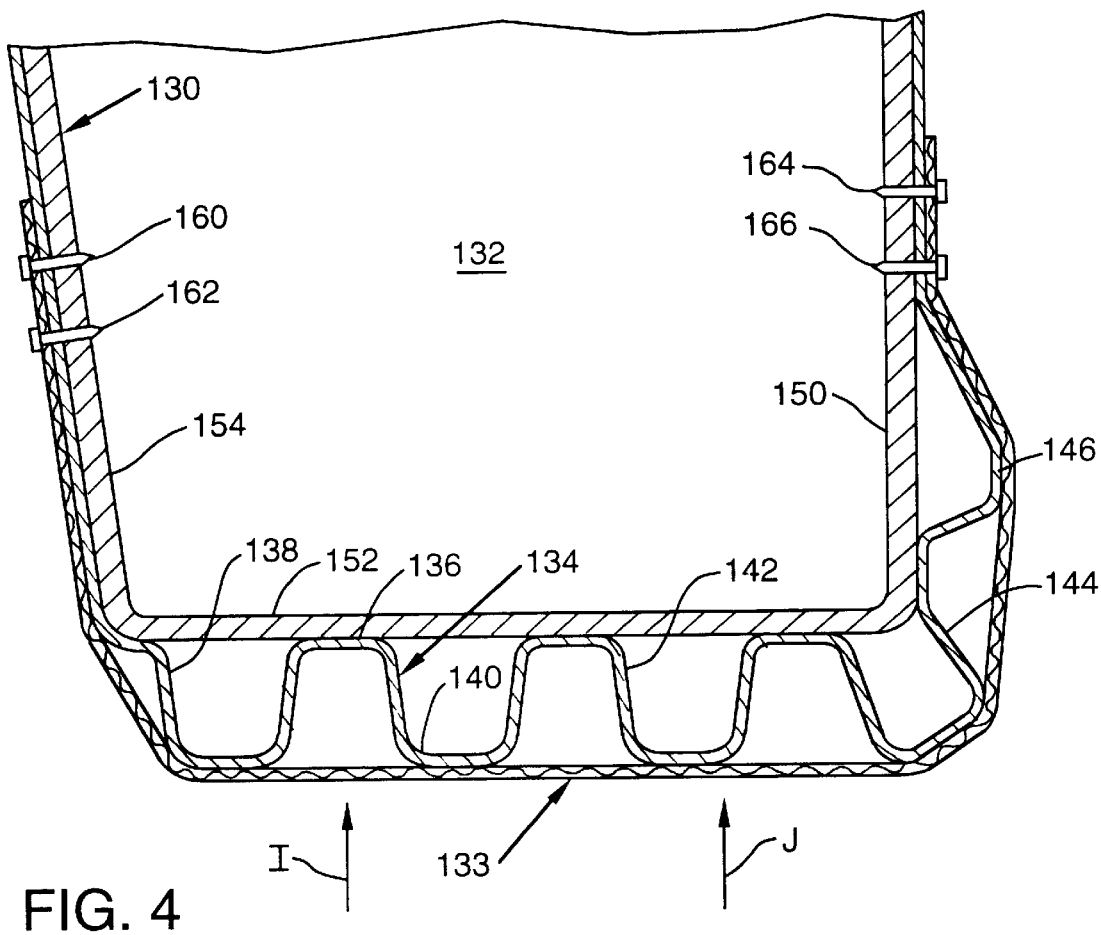
FIG. 4 is a fragmentary cross-sectional view showing a vehicle greenhouse support of the present invention.

Referring to FIG. 4, there is shown an elongated substantially rigid beam 130 which has a hollow 132 and is adapted to be employed in a vehicle greenhouse support assembly of the present invention. In conventional automobile use, a trim member, such as 133, may be composed of flexible synthetic fabric or resinous plastic sheet to provide a more aesthetically pleasing appearance. If made of plastic, trim member 133 may be created by molding. In such prior art constructions, however, the composition and thickness of the trim 133 does not provide any meaningful cushioning or energy absorbing effects so as to resist potentially damaging contact between an occupant and beam 130. The beam 130 will generally be made of steel or a similar rigid material of desired load bearing capacity. As shown in the solution of the present invention, a deformable sheet 134 has a base portion 136 and a plurality of protrusions 138, 140, 142, 144, 146. It is noted that the portion of the deformable sheet 134, which contains the protrusions 138–146 (even numbers only), covers walls 150 and 152 of the beam 130 and portions of the deformable sheet 134 which do not have protrusions, cover beam wall 154. If wall 154 was an interiorly exposed portion likely to have contact with an occupant in the event of a collision, protrusions could be provided on that wall as well.

It will be noted that the base portion 136 of the formable sheet 134 has portions in surface to surface contact with the beam 130 and the outermost portions of the protrusions 138–146 (even numbers only) have portions in surface to surface contact with the inner surface of trim 132. This is the preferred embodiment having generally frustoconically shaped protrusions 138–146.

It is preferred that the inner surface of deformable sheet 134 be adhesively secured with a beam 130 along portions which are in surface to surface contact with each other, although if desired mechanical fasteners could be used. The reason a suitable adhesive, such as an epoxy, for example, is preferred, is that it provides more uniform bonding in the beam 130 and the deformable sheet 134, so as to provide more effective unitary action and absorption of impact energy. In another approach, the trim 132 may be secured to the deformable sheet by mechanical fasteners 160, 162, 164, 166, which mechanical fasteners may be suitable screws, for example. These means for securing the trim 133 to the beam 130 may be employed in combination with each other, alone, or in combination with other suitable means.

In the event of impact between an occupant of the vehicle and the vehicle greenhouse support assembly shown in FIG. 4, as by forces applied in the directions indicated by arrows I and J, the impact energy will be converted into deformation and/or tearing of deformable sheet 134, thereby reducing the impact force between the occupant and, more specifically, the occupant's head and the rigid beam 130, thereby reducing the likelihood of meaningful injury resulting from the vehicle colliding with another vehicle or another object.

The method of the present invention involves creating a plurality of protrusions in a deformable sheet and securing the protrusion containing sheet 134 in intimate contact with the beam 130. At least a portion of the sheet 134 is covered by overlying trim 133.

The present invention facilitates providing this type of protection with a wide variety of greenhouse supports, including beams, pillars, rails and other members, with the specific configuration, dimensions and spacings of the protrusions determined based on particular need. Also, the protrusions may all be of the same size and shape or may vary in size and shape. The protrusion containing sheet is deformable so as to be conformed to the shape of the underlying beam. This protection is provided in an economical manner without meaningful addition of weight to the vehicle or use of substantial interior space in providing the enhanced protection.

In practicing the method of the present invention, one provides the desired protrusions on the sheet, determines the size of sheet and secures the same to the region of the greenhouse support beam to be covered and, thereafter, provides the appropriate trim. In the event of a collision, one need merely remove the trim and replace the deformable sheet in order to restore the degree of protection.

The present invention has, therefore, provided an effective means of resisting head injuries in vehicles during collisions in a manner which is compatible with avoidance of increased weight and use of additional space in the interior of the vehicle.

All of this is accomplished in a manner which facilitates providing effective protection throughout the greenhouse.

Whereas particular embodiments of the invention have been described herein, for purpose of illustration, it will be evident to those skilled in the art that numerous variations of the details may be made without departing from the invention as defined in the appended claims.

We claim:

1. A vehicle greenhouse support assembly comprising
   an elongated substantially rigid greenhouse support beam,
   a deformable sheet secured to and covering at least a portion of said beam adapted to face the interior of said vehicle,
   said deformable sheet having a plurality of protrusions spaced from adjacent said protrusions, and
   an overlying trim element covering at least a portion of said deformable sheet.

2. The vehicle greenhouse support assembly of claim 1 including said deformable sheet being an aluminum sheet.

3. The vehicle greenhouse support assembly of claim 2 including said protrusions being hollow.

4. The vehicle greenhouse support assembly of claim 2 including said aluminum sheet in regions other than said protrusions having a thickness of about 0.01 inch to 0.02 inch.

5. The vehicle greenhouse support assembly of claim 2 including said protrusions covering about 30 to 60 percent of the sheet area.

6. The vehicle greenhouse support assembly of claim 2 including said protrusions having a generally frustoconical configuration.

7. The vehicle greenhouse support assembly of claim 6 including said protrusions having a height of about 3/8 inch to 7/8 inch.

8. The vehicle greenhouse support assembly of claim 7 including said protrusions having a diameter at the base of about 1.00 inch.

9. The vehicle greenhouse support assembly of claim 1 including said deformable sheet being adhesively secured to said beam.

10. The vehicle greenhouse support assembly of claim 9 including said trim being secured to said beam by mechanical fasteners.

11. The vehicle greenhouse support assembly of claim 1 including said deformable sheet being secured to more than one surface of said beam.

12. The vehicle greenhouse support assembly of claim 1 including said protrusions being disposed in rows.

13. The vehicle greenhouse support assembly of claim 12 including said protrusions having a center-to-center spacing within said row of about 1 to 1.5 inches.

14. The vehicle greenhouse support assembly of claim 13 including the spacing between said protrusion rows being about 1 to 1.5 inches.

15. The vehicle greenhouse support assembly of claim 1 including said deformable sheet being intimately secured between said trim and said beam, whereby impact on said trim will cause deformation of said deformable sheet.

16. The vehicle greenhouse support assembly of claim 2 including said rigid beam being composed of steel and said trim being a synthetic fabric or plastic sheet.

17. A vehicle comprising
    a passenger compartment having a plurality of greenhouse supports, at least one said greenhouse support having a greenhouse support assembly including
    an elongated substantially rigid greenhouse support beam,
    a deformable sheet being secured to and covering at least a portion of said beam adapted to face the interior of said vehicle,
    said deformable sheet having a plurality of protrusions spaced from adjacent said protrusions, and
    an overlying trim element covering at least a portion of said deformable sheet.

18. The vehicle of claim 17 including said deformable sheet being an aluminum sheet.

19. The vehicle of claim 18 including said protrusions being hollow.

20. The vehicle of claim 18 including said aluminum sheet in regions other than said protrusions having a thickness of about 0.01 inch to 0.02 inch.

21. The vehicle of claim 18 including said protrusions covering about 30 to 60 percent of the sheet area.

22. The vehicle of claim 18 including said protrusions having a generally frustoconical configuration.

23. The vehicle of claim 22 including said protrusions having a height of about 3/8 inch to 7/8 inch.

24. The vehicle of claim 23 including said protrusions having a diameter measured at the bases of about 1 inch.

25. The vehicle of claim 17 including said deformable sheet being adhesively secured to said beam.

26. The vehicle of claim 25 including said trim being secured to said beam by mechanical fasteners.

27. The vehicle of claim 17 including said deformable sheet being secured to more than one surface of said beam.

28. The vehicle of claim 17 including said protrusions being disposed in rows.

29. The vehicle of claim 28 including said protrusions having a center-to-center spacing between said rows of about 1 to 1.5 inches.

30. The vehicle of claim 29 including the spacing between said protrusion within a row being about 1 to 1.5 inches.

31. The vehicle of claim 17 including said deformable sheet being intimately secured between said trim and said beam, whereby impact on said trim will cause deformation of said deformable sheet.

32. The vehicle of claim 17 including said rigid beam being a body pillar.

33. The vehicle greenhouse support of claim 17 including said rigid beam being a rail.

34. The vehicle greenhouse support of claim 17 including said vehicle being an automobile, and said automobile having a plurality of said vehicle greenhouse support assemblies.

35. A method of making a vehicle greenhouse support assembly comprising providing a substantially rigid greenhouse support beam, creating a plurality of protrusions in a deformable sheet with said protrusions being spaced from adjacent said protrusions, conforming said deformable sheet to the shape of the beam, securing said deformable sheet in intimate overlying contact with said rigid beam, and covering at least a portion of said deformable sheet with an overlying trim secured thereto.

36. The method of claim 35 including creating said deformable sheet by establishing said plurality of protrusions in an aluminum sheet.

37. The method of claim 36 including establishing said protrusions in about 30 to 60 percent of the sheet area.

38. The method of claim 37 including establishing said protrusions with a height of about $3/8$ inch to about $7/8$ inch.

39. The method of claim 38 including adhesively securing said deformable sheet to said beam.

40. The method of claim 39 including securing said trim to said beam by mechanical fasteners.

41. The method of claim 35 including establishing said protrusions by deforming portions of said sheet beyond the yield point.

42. The method of claim 41 including establishing said protrusions as hollow protrusions.

43. The method of claim 42 including securing said assembly such that at least a portion of said deformable sheet is in surface to surface engagement with said beam and another portion of said deformable sheet is in surface to surface engagement with said overlying trim.

* * * * *